US006260016B1

(12) United States Patent
Holm et al.

(10) Patent No.: US 6,260,016 B1
(45) Date of Patent: Jul. 10, 2001

(54) SPEECH SYNTHESIS EMPLOYING PROSODY TEMPLATES

(75) Inventors: Frode Holm; Kazue Hata, both of Santa Barbara, CA (US)

(73) Assignee: Matsushita Electric Industrial Co., Ltd.

(*) Notice: Subject to any disclaimer, the term of this patent is extended or adjusted under 35 U.S.C. 154(b) by 0 days.

(21) Appl. No.: 09/200,027

(22) Filed: Nov. 25, 1998

(51) Int. Cl.[7] .......................... G10L 13/06; G10L 13/00; G06F 15/00

(52) U.S. Cl. .......................... 704/260; 704/258; 704/200; 704/200.1

(58) Field of Search .................................. 704/200, 258, 704/260, 264, 268, 269

(56) References Cited

U.S. PATENT DOCUMENTS 5,384,893 * 1/1995 Hutchins .............................. 704/260
5,592,585 1/1997 Van Coile et al. .
5,636,325 * 6/1997 Farrett ................................. 704/260
5,642,520 6/1997 Takeshita et al. .
5,652,828 7/1997 Silverman .
5,696,879 12/1997 Cline et al. .
5,704,009 12/1997 Cline et al. .
5,727,120 3/1998 Van Coile et al. .
5,729,694 3/1998 Holzrichter et al. .
5,732,395 3/1998 Silverman .
5,749,071 5/1998 Silverman .
5,751,906 5/1998 Silverman .
5,796,916 8/1998 Meredith .
5,850,629 * 12/1998 Holm et al. .......................... 704/260
5,878,393 * 3/1999 Hata et al. ........................... 704/260
5,905,972 * 5/1999 Huang et al. ......................... 704/258
5,924,068 * 7/1999 Richard et al. ...................... 704/260
5,966,691 * 10/1999 Kibre et al. .......................... 704/260

FOREIGN PATENT DOCUMENTS 0 833 304 A2 4/1998 (EP) .
0 833 304 A3 3/1999 (EP) .

OTHER PUBLICATIONS

Chung–Hsien Wu and Jau–Hung Chen, "Template–Driven Generation of Prosodic Information for Chinese Concatenative Synthesis," 1999 IEEE Publication, pp. 65–68.

* cited by examiner

*Primary Examiner*—Richemond Dorvil
*Assistant Examiner*—Daniel A Nolan
(74) *Attorney, Agent, or Firm*—Harness, Dickey & Pierce, P.L.C.

(57) ABSTRACT

Prosody templates, constructed during system design, store intonation (F0) and duration information based on syllabic stress patterns for the target word. The prosody templates are constructed so that words exhibiting the same stress pattern will be assigned the same prosody template. The prosody template information is preferably stored in a normalized form to reduce noise level in the statistical measures. The synthesizer uses a word dictionary that specifies the stress patterns associated with each stored word. These stress patterns are used to access the prosody template database. F0 and duration information is then extracted from the selected template, de-normalized and applied to the phonemic information to produce a natural human-sounding prosody in the synthesized output.

12 Claims, 7 Drawing Sheets

Training Speech (Sentences)
30
32
Labeling Tool
34
Segmented Sentences (Words)
Assign Stress to Syllables
36
38
'0' - No Stress
'1' - Primary
'2' - Secondary
Group Data by Stress Pattern
40
Single Syllable
'1'
Two Syllable
'10'
'01'
'12'
Three Syllable
'010'
n - Syllable
For Each Stress Pattern Group:
Normalize F0 With Respect to Time
42
44
Resample to a Fixed Number of F0 Points (e.g. 30 per syllable)
To 1

SPEECH SYNTHESIS EMPLOYING PROSODY TEMPLATES

BACKGROUND AND SUMMARY OF THE INVENTION

The present invention relates generally to text-to-speech (tts) systems and speech synthesis. More particularly, the invention relates to a system for providing more natural sounding prosody through the use of prosody templates.

The task of generating natural human-sounding prosody for text-to-speech and speech synthesis has historically been one of the most challenging problems that researchers and developers have had to face. Text-to-speech systems have in general become infamous for their "robotic" intonations. To address this problem some prior systems have used neural networks and vector clustering algorithms in an attempt to simulate natural sounding prosody. Aside from being only marginally successful, these "black box" computational techniques give the developer no feedback regarding what the crucial parameters are for natural sounding prosody.

The present invention takes a different approach, in which samples of actual human speech are used to develop prosody templates. The templates define a relationship between syllabic stress patterns and certain prosodic variables such as intonation (F0) and duration. Thus, unlike prior algorithmic approaches, the invention uses naturally occurring lexical and acoustic attributes (e.g., stress pattern, number of syllables, intonation, duration) that can be directly observed and understood by the researcher or developer.

The presently preferred implementation stores the prosody templates in a database that is accessed by specifying the number of syllables and stress pattern associated with a given word. A word dictionary is provided to supply the system with the requisite information concerning number of syllables and stress patterns. The text processor generates phonemic representations of input words, using the word dictionary to identify the stress pattern of the input words. A prosody module then accesses the database of templates, using the number of syllables and stress pattern information to access the database. A prosody module for the given word is then obtained from the database and used to supply prosody information to the sound generation module that generates synthesized speech based on the phonemic representation and the prosody information.

The presently preferred implementation focuses on speech at the word level. Words are subdivided into syllables and thus represent the basic unit of prosody. The preferred system assumes that the stress pattern defined by the syllables determines the most perceptually important characteristics of both intonation (F0) and duration. At this level of granularity, the template set is quite small in size and easily implemented in text-to-speech and speech synthesis systems. While a word level prosodic analysis using syllables is presently preferred, the prosody template techniques of the invention can be used in systems exhibiting other levels of granularity. For example, the template set can be expanded to allow for more feature determiners, both at the syllable and word level. In this regard, microscopic F0 perturbations caused by consonant type, voicing, intrinsic pitch of vowels and segmental structure in a syllable can be used as attributes with which to categorize certain prosodic patterns. In addition, the techniques can be extended beyond the word level F0 contours and duration patterns to phrase-level and sentence-level analyses.

For a more complete understanding of the invention, its objectives and advantages, refer to the following specification and to the accompanying drawings.

DESCRIPTION OF THE PREFERRED EMBODIMENT

When text is read by a human speaker, the pitch rises and falls, syllables are enunciated with greater or lesser intensity, vowels are elongated or shortened, and pauses are inserted, giving the spoken passage a definite rhythm. These features comprise some of the attributes that speech researchers refer to as prosody. Human speakers add prosodic information automatically when reading a passage of text allowed. The prosodic information conveys the reader's interpretation of the material. This interpretation is an artifact of human experience, as the printed text contains little direct prosodic information.

When a computer-implemented speech synthesis system reads or recites a passage of text, this human-sounding prosody is lacking in conventional systems. Quite simply, the text itself contains virtually no prosodic information, and the conventional speech synthesizer thus has little upon which to generate the missing prosody information. As noted earlier, prior attempts at adding prosody information have focused on ruled-based techniques and on neural network techniques or algorithmic techniques, such as vector clustering techniques. Rule-based techniques simply do not sound natural and neural network and algorithmic techniques cannot be adapted and cannot be used to draw inferences needed for further modification or for application outside the training set used to generate them.

The present invention addresses the prosody problem through use of prosody templates that are tied to the syllabic stress patterns found within spoken words. More specifically, the prosodic templates store F0 intonation information and duration information. This stored prosody information is captured within a database and arranged according to syllabic stress patterns. The presently preferred embodiment defines three different stress levels. These are designated by numbers 0, 1 and 2. The stress levels incorporate the following:

| | |
|---|---|
| 0 | no stress |
| 1 | primary stress |
| 2 | secondary stress |

According to the preferred embodiment, single-syllable words are considered to have a simple stress pattern corresponding to the primary stress level '1.' Multi-syllable words can have different combinations of stress level patterns. For example, two-syllables words may have stress patterns '10', '01' and '12.'

The presently preferred embodiment employs a prosody template for each different stress pattern combination. Thus stress pattern '1' has a first prosody template, stress pattern '10' has a different prosody template, and so forth. Each prosody template contains prosody information such as intonation and duration information, and optionally other information as well.

Figure 1:
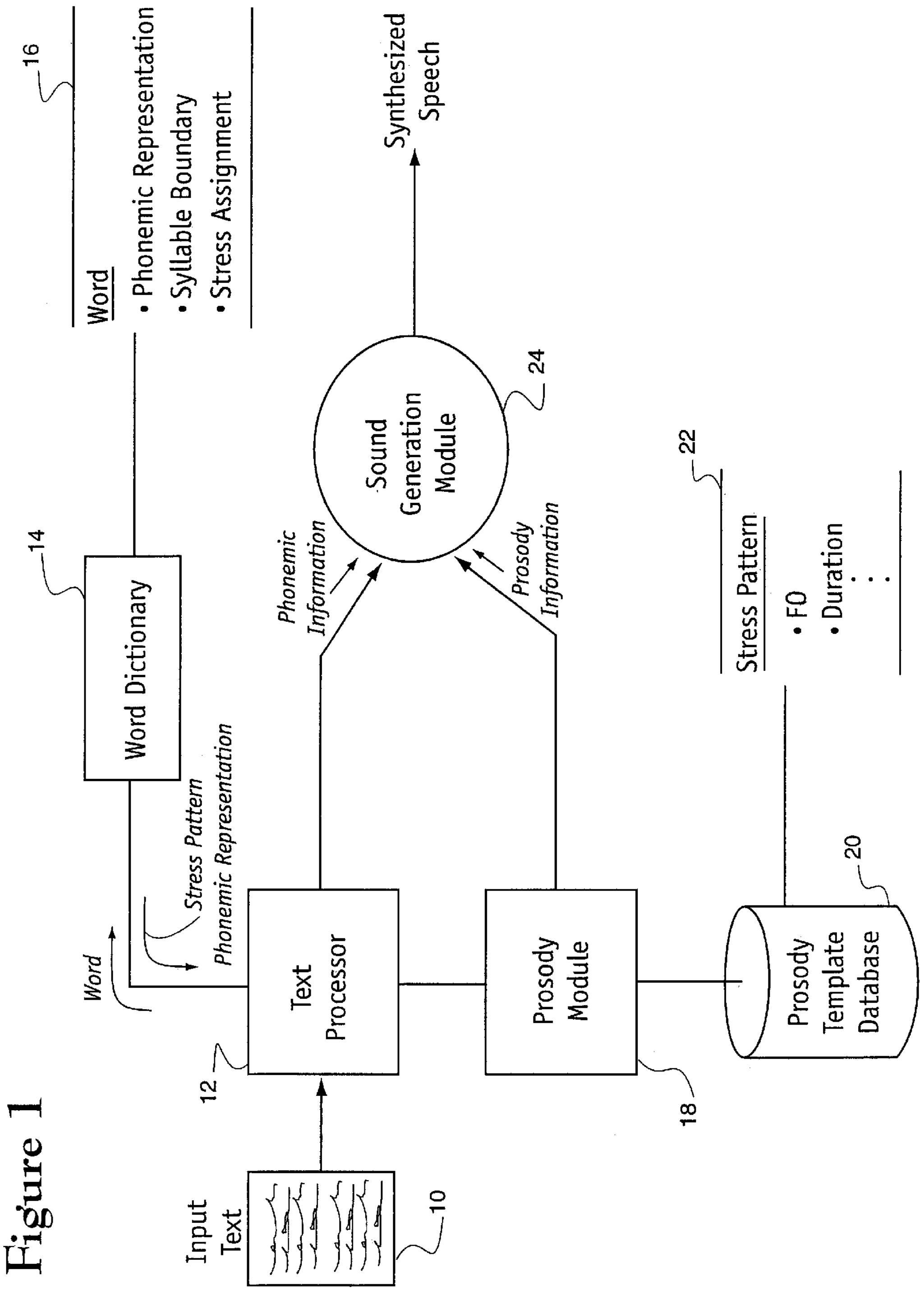
FIG. 1 is a block diagram of a speech synthesizer employing prosody templates in accordance with the invention.

FIG. 1 illustrates a speech synthesizer that employs the prosody template technology of the present invention. Referring to FIG. 1, an input text 10 is supplied to text processor module 12 as a sequence or string of letters that define words. Text processor 12 has an associated word dictionary 14 containing information about a plurality of stored words. In the preferred embodiment the word dictionary has a data structure illustrated at 16 according to which words are stored along with certain phonemic representation information and certain stress pattern information. More specifically, each word in the dictionary is accompanied by its phonemic representation, information identifying the word syllable boundaries and information designating how stress is assigned to each syllable. Thus the word dictionary 14 contains, in searchable electronic form, the basic information needed to generate a pronunciation of the word.

Text processor 12 is further coupled to prosody module 18 which has associated with it the prosody template database 20. In the presently preferred embodiment the prosody templates store intonation (F0) and duration data for each of a plurality of different stress patterns.

The single-word stress pattern '1' comprises a first template, the two-syllable pattern '10' comprises a second template, the pattern'01' comprises yet another template, and so forth. The templates are stored in the database by stress pattern, as indicated diagrammatically by data structure 22 in FIG. 1. The stress pattern associated with a given word serves as the database access key with which prosody module 18 retrieves the associated intonation and duration information. Prosody module 18 ascertains the stress pattern associated with a given word by information supplied to it via text processor 12. Text processor 12 obtains this information using the word dictionary 14.

While the presently preferred prosody templates store intonation and duration information, the template structure can readily be extended to include other prosody attributes.

The text processor 12 and prosody module 18 both supply information to the sound generation module 24. Specifically, text processor 12 supplies phonemic information obtained from word dictionary 14 and prosody module 18 supplies the prosody information (e.g. intonation and duration). The sound generation module then generates synthesized speech based on the phonemic and prosody information.

The presently preferred embodiment encodes prosody information in a standardized form in which the prosody information is normalized and parameterized to simplify storage and retrieval within database 20. The sound generation module 24 de-normalizes and converts the standardized templates into a form that can be applied to the phonemic information supplied by text processor 12. The details of this process will be described more fully below. However, first, a detailed description of the prosody templates and their construction will be described.

Figure 2A:
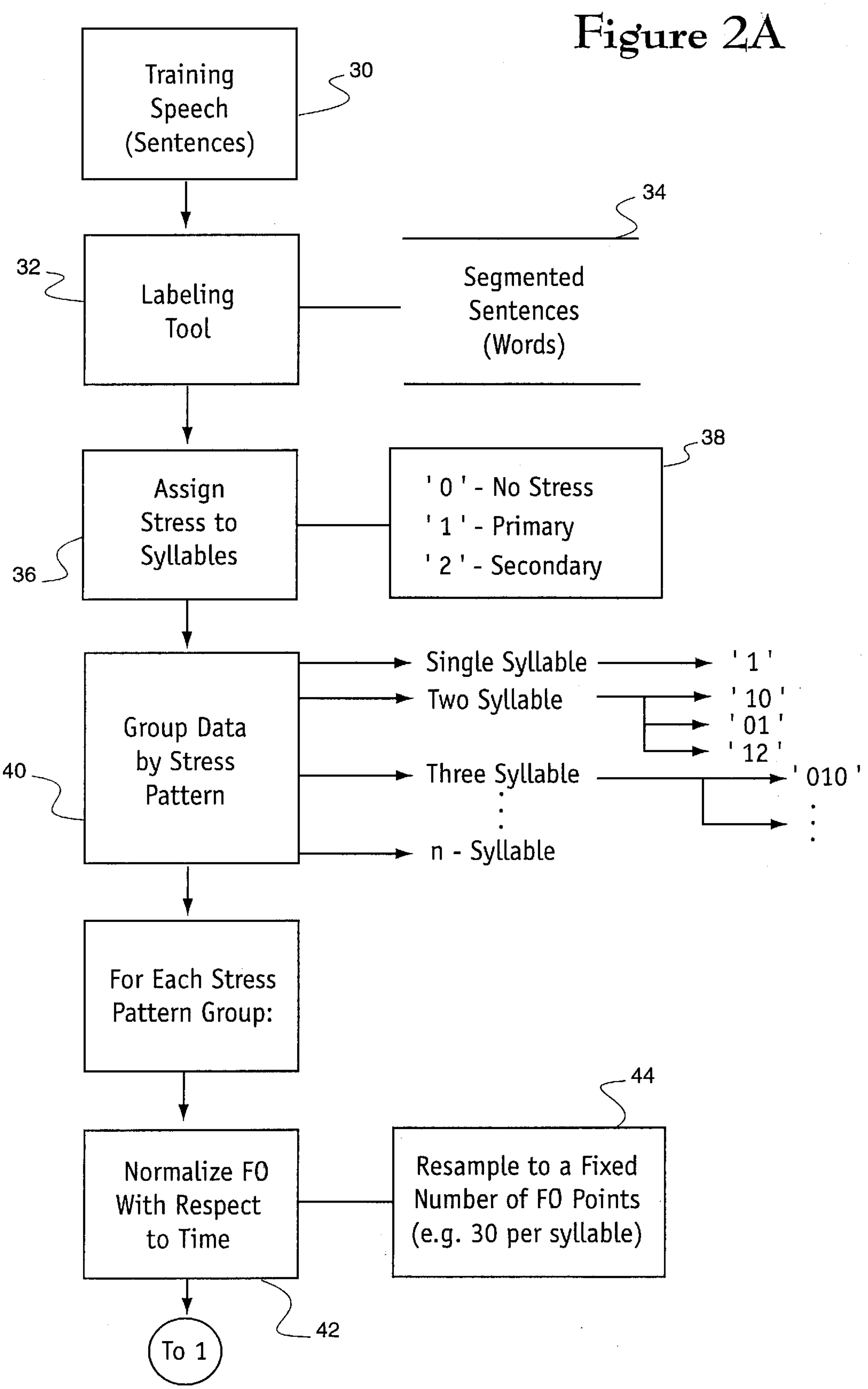
FIG. 2A and B is a block diagram illustrating how prosody templates may be developed.
Figure 2B:
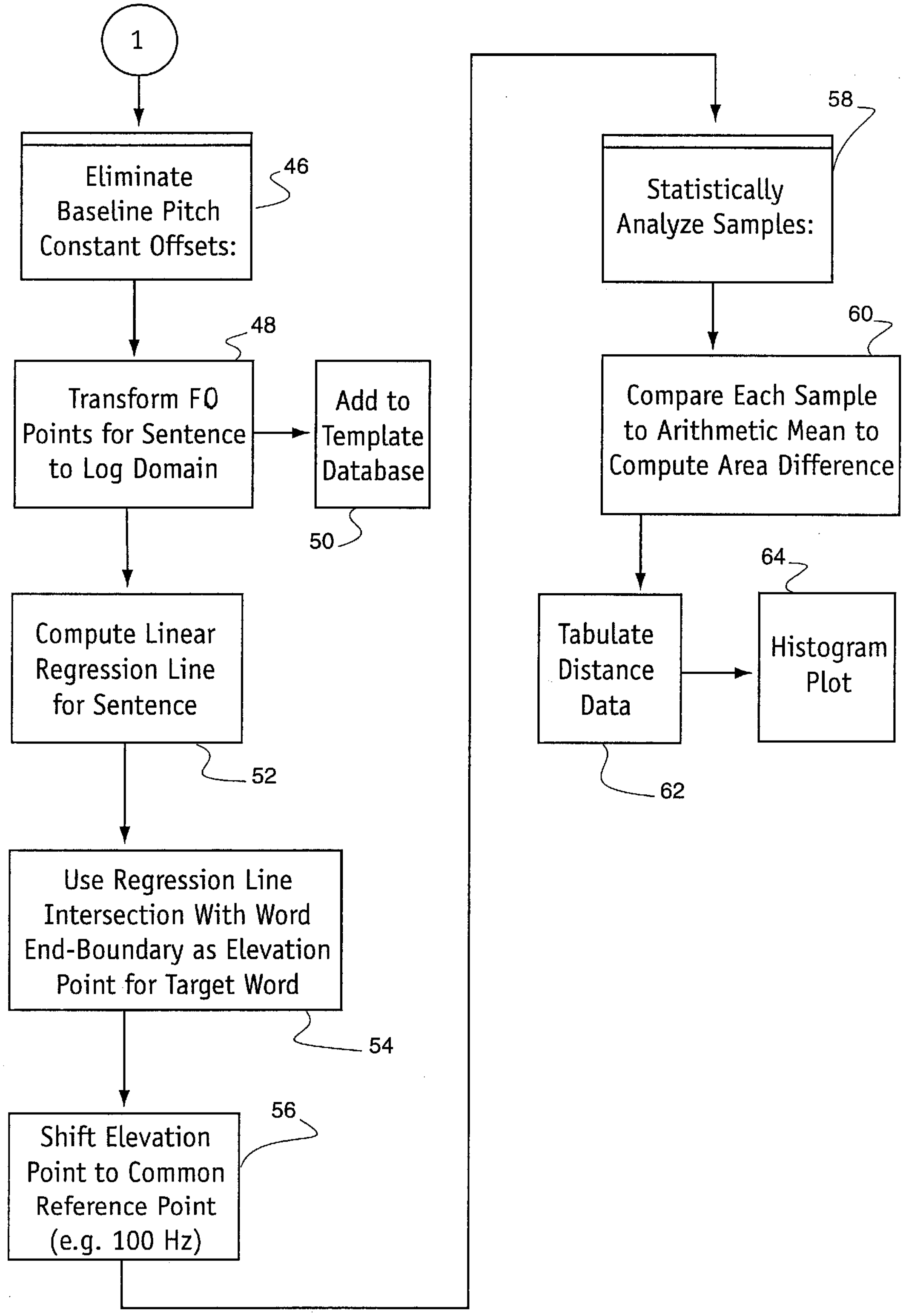

Referring to FIG. 2A and 2B, the procedure for generating suitable prosody templates is outlined. The prosody templates are constructed using human training speech, which may be pre-recorded and supplied as a collection of training speech sentences 30. Our presently preferred implementation was constructed using approximately 3,000 sentences with proper nouns in the sentence-initial position. The collection of training speech 30 was collected from a single female speaker of American English. Of course, other sources of training speech may also be used.

The training speech data is initially pre-processed through a series of steps. First, a labeling tool 32 is used to segment the sentences into words and to segment the words into syllables and syllables into phonemes which are then stored at 34. Then stresses are assigned to the syllables as depicted at step 36. In the presently preferred implementation, a three-level stress assignment was used in which '0' represented no stress, '1' represented the primary stress and '2' represented the secondary stress, as illustrated diagrammatically at 38. Subdivision of words into syllables and phonemes and assigning the stress levels can be done manually or with the assistance of an automatic or semi-automatic tracker that performs F0 editing. In this regard, the pre-processing of training speech data is somewhat time-consuming, however it only has to be performed once during development of the prosody templates. Accurately labeled and stress-assigned data is needed to insure accuracy and to reduce the noise level in subsequent statistical analysis.

After the words have been labeled and stresses assigned, they may be grouped according to stress pattern. As illustrated at 40, single-syllable words comprise a first group. Two-syllable words comprise four additional groups, the '10' group, the '01' group, the '12' group and the '21' group. Similarly three-syllable, four-syllable . . . n-syllable words can be similarly grouped according to stress patterns.

Next, for each stress pattern group the fundamental pitch or intonation data F0 is normalized with respect to time (thereby removing the time dimension specific to that recording) as indicated at step 42. This may be accomplished in a number of ways. The presently preferred technique, described at 44 resamples the data to a fixed number of F0 points. For example, the data may be sampled to comprise 30 samples per syllable.

Next a series of additional processing steps are performed to eliminate baseline pitch constant offsets, as indicated generally at 46. The presently preferred approach involves transforming the F0 points for the entire sentence into the log domain as indicated at 48. Once the points have been transformed into the log domain they may be added to the template database as illustrated at 50. In the presently preferred implementation all log domain data for a given group are averaged and this average is used to populate the prosody template. Thus all words in a given group (e.g. all two-syllable words of the '10' pattern) contribute to the single average value used to populate the template for that group. While arithmetic averaging of the data gives good results, other statistical processing may also be employed if desired.

To assess the robustness of the prosody template, some additional processing can be performed as illustrated in FIG. 2B beginning at step 52. The log domain data is used to compute a linear regression line for the entire sentence. The regression line intersects with the word end-boundary, as indicated at step 54, and this intersection is used as an elevation point for the target word. In step 56 the elevation point is shifted to a common reference point. The preferred embodiment shifts the data either up or down to a common reference point of nominally 100 Hz.

As previously noted, prior neural network techniques do not give the system designer the opportunity to adjust parameters in a meaningful way, or to discover what factors contribute to the output. The present invention allows the designer to explore relevant parameters through statistical analysis. This is illustrated beginning at step 58. If desired, the data are statistically analyzed at 58 by comparing each sample to the arithmetic mean in order to compute a measure of distance, such as the area difference as at 60. We use a measure such as the area difference between two vectors as set forth in the equation below. We have found that this measure is usually quite good as producing useful information about how similar or different the samples are from one another. Other distance measures may be used, including weighted measures that take into account psycho-acoustic properties of the sensor-neural system.

$$d(Y_i) = c\sqrt{\sum_{k=1}^{N} (y_{ik} - \overline{Y}_k)^2 v_{ik}}$$

d=measure of the difference between two vectors i=index of vector being compared $Y_i$=F0 contour vector $\overline{Y}$=arithmetic mean vector for group N=samples in a vector y=sample value $v_i$=voicing function. 1 if voicing on, 0 otherwise.

c=scaling factor (optional)

Figure 3:
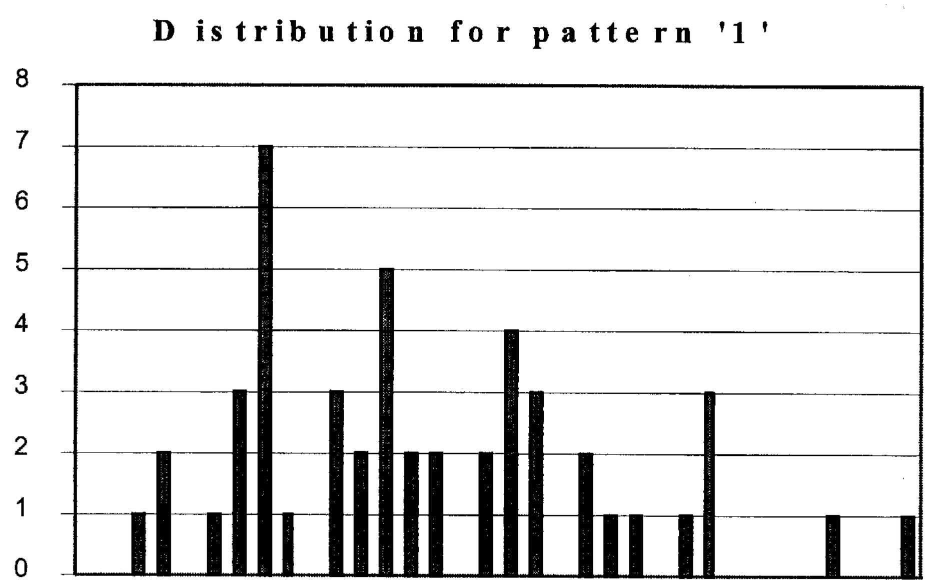
FIG. 3 is a distribution plot for an exemplary stress pattern.

For each pattern this distance measure is then tabulated as at 62 and a histogram plot may be constructed as at 64. An example of such a histogram plot appears in FIG. 3, which shows the distribution plot for stress pattern '1.' In the plot the x-access is on an arbitrary scale and the y-access is the count frequency for a given distance. Dissimilarities become significant around ⅓ on the x-access.

Figure 4:
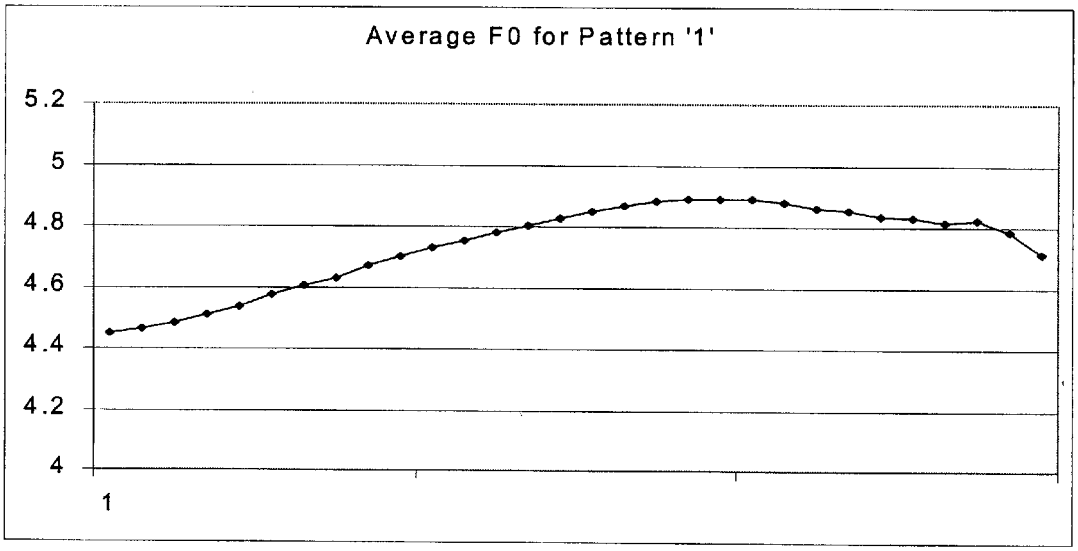
FIG. 4 is a graph of the average F0 contour for the stress pattern of FIG. 3.

By constructing histogram plots as described above, the prosody templates can be assessed to determine how closely the samples are to each other and thus how well the resulting template corresponds to a natural sounding intonation. In other words, the histogram tells whether the grouping function (stress pattern) adequately accounts for the observed shapes. A wide spread shows that it does not, while a large concentration near the average indicates that we have found a pattern determined by stress alone, and hence a good candidate for the prosody template. FIG. 4 shows a corresponding plot of the average F0 contour for the '1' pattern. The data graph in FIG. 4 corresponds to the distribution plot in FIG. 3. Note that the plot in FIG. 4 represents normalized log coordinates. The bottom, middle and top correspond to 50 Hz, 100 Hz and 200 Hz, respectively. FIG. 4 shows the average F0 contour for the single-syllable pattern to be a slowly rising contour.

Figure 5:
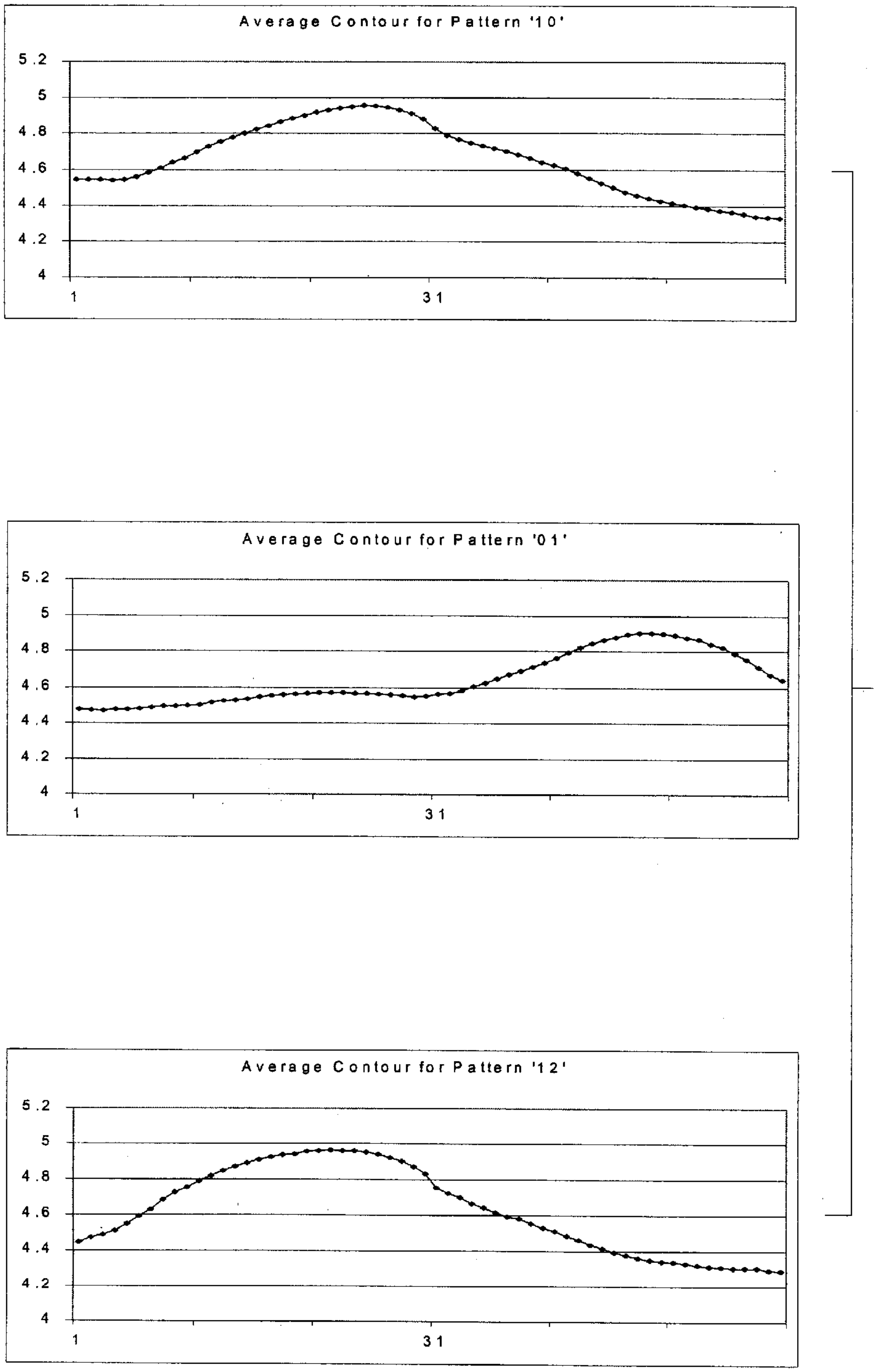
FIG. 5 is a series of graphs illustrating the average contour for exemplary two-syllable and three-syllable data.

FIG. 5 shows the results of our F0 study with respect to the family of two-syllable patterns. In FIG. 5 the pattern '10' is shown at A, the pattern '01' is shown at B and the pattern '12' is shown at C. Also included in FIG. 5 is the average contour pattern for the three-syllable group '010.'

Comparing the two-syllable patterns in FIG. 5, note that the peak location differs as well as the overall F0 contour shape. The '10' pattern shows a rise-fall with a peak at about 80% into the first syllable, whereas the '01' pattern shows a flat rise-fall pattern, with a peak at about 60% into the second syllable. In these figures the vertical line denotes the syllable boundary.

The '12' pattern is very similar to the '10' pattern, but once F0 reaches the target point of the rise, the '12' pattern has a longer stretch in this higher F0 region. This implies that there may be a secondary stress.

The '010' pattern of the illustrated three-syllable word shows a clear bell curve in the distribution and some anomalies. The average contour is a low flat followed by a rise-fall contour with the F0 peak at about 85% into the second syllable. Note that some of the anomalies in this distribution may correspond to mispronounced words in the training data.

The histogram plots and average contour curves may be computed for all different patterns reflected in the training data. Our studies have shown that the F0 contours and duration patterns produced in this fashion are close to or identical to those of a human speaker. Using only the stress pattern as the distinguishing feature we have found that nearly all plots of the F0 curve similarity distribution exhibit a distinct bell curve shape. This confirms that the stress pattern is a very effective criterion for assigning prosody information.

Figure 6:
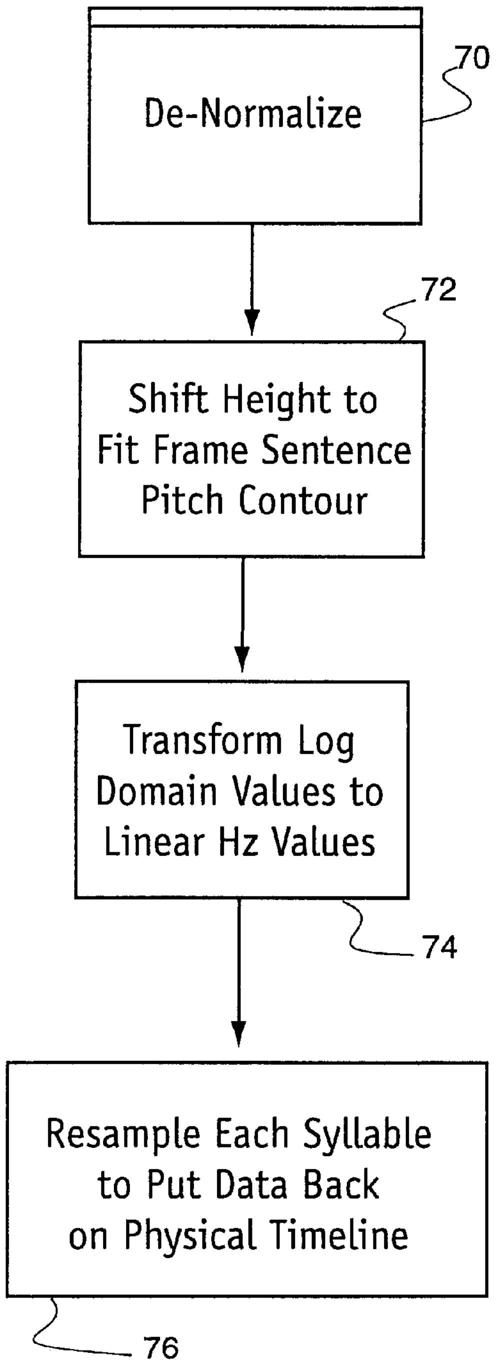
FIG. 6 is a flowchart diagram illustrating the denormalizing procedure employed by the preferred embodiment.

With the prosody template construction in mind, the sound generation module 24 (FIG. 1) will now be explained in greater detail. Prosody information extracted by prosody module 18 is stored in a normalized, pitch-shifted and log domain format. Thus, in order to use the prosody templates, the sound generation module must first de-normalize the information as illustrated in FIG. 6 beginning at step 70. The de-normalization process first shifts the template (step 72) to a height that fits the frame sentence pitch contour. This constant is given as part of the retrieved data for the frame-sentence and is computed by the regression-line coefficients for the pitch-contour for that sentence. (See FIG. 2 steps 52–56).

Meanwhile the duration template is accessed and the duration information is denormalized to ascertain the time (in milliseconds) associated with each syllable. The templates log-domain values are then transformed into linear Hz values at step 74. Then, at step 76, each syllable segment of the template is re-sampled with a fixed duration for each point (10 ms in the current embodiment) such that the total duration of each corresponds to the denormalized time value specified. This places the intonation contour back onto a physical timeline. At this point, the transformed template data is ready to be used by the sound generation module. Naturally, the de-normalization steps can be performed by any of the modules that handle prosody information. Thus the de-normalizing steps illustrated in FIG. 6 can be performed by either the sound generation module 24 or the prosody module 18.

The presently preferred embodiment stores duration information as ratios of phoneme values versus globally determined durations values. The globally determined values correspond to the mean duration values observed across the entire training corpus. The per-syllable values represent the sum of the observed phoneme or phoneme group durations within a given syllable. Per-syllable/global ratios are computed and averaged to populate each member of the prosody template. These ratios are stored in the prosody template and are used to compute the actual duration of each syllable.

Obtaining detailed temporal prosody patterns is somewhat more involved that it is for F0 contours. This is largely due to the fact that one cannot separate a high level prosodic intent from purely articulatory constraints, merely by examining individual segmental data.

Prosody Database Design

Figure 7:
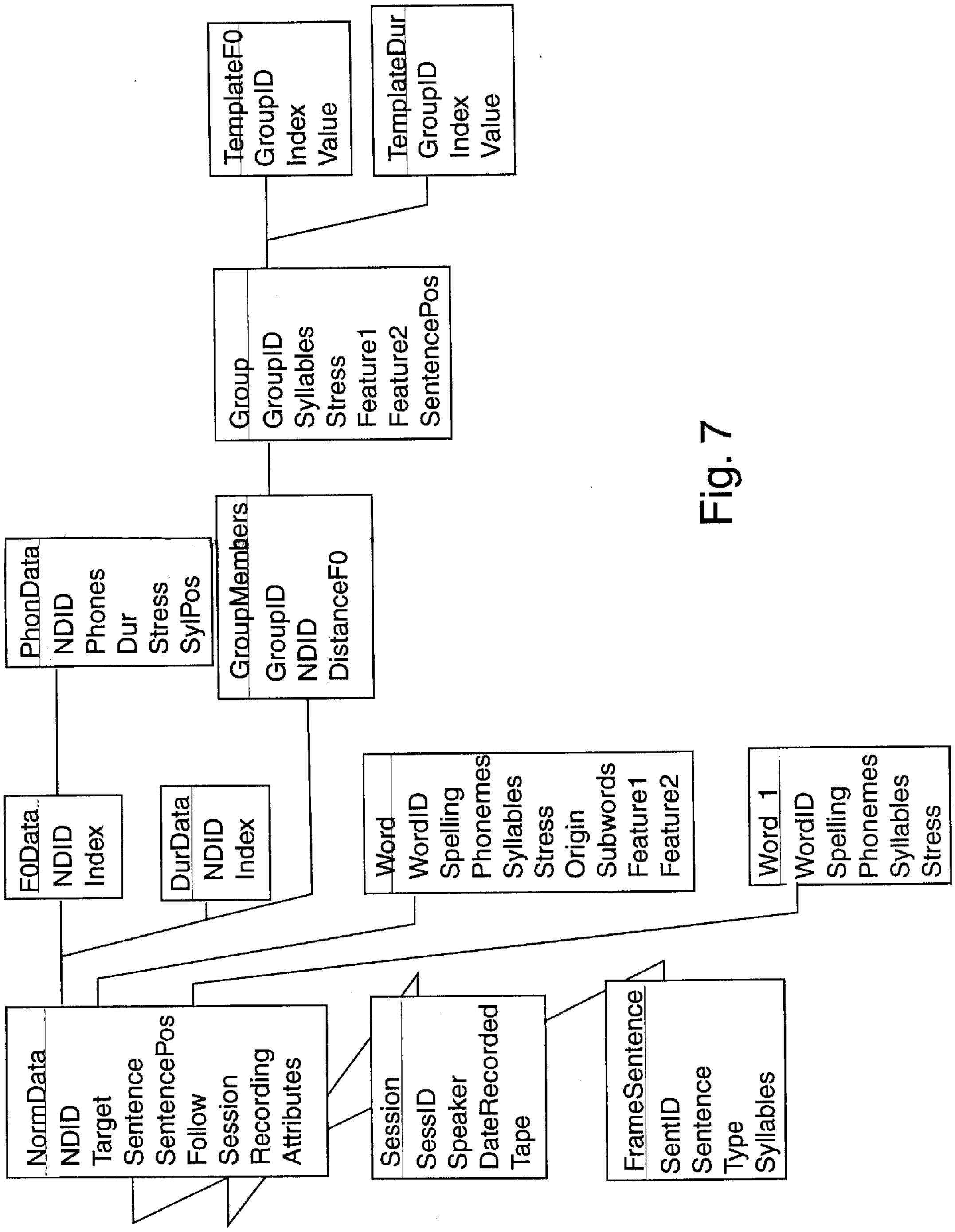
FIG. 7 is a database diagram showing the relationships among database entities in the preferred embodiment.

The structure and arrangement of the presently preferred prosody database is further described by the relationship diagram of FIG. 7 and by the following database design specification. The specification is provided to illustrate a preferred embodiment of the invention. Other database design specifications are also possible.

NORMDATA

NDID—Primary Key
Target—Key (WordID)
Sentence—Key (SentID)
SentencePos—Text
Follow—Key (WordID)
Session—Key (SessID)
Recording—Text
Attributes—Text
WORD
WordID—Primary Key
Spelling—Text
Phonemes—Text
Syllables—Number
Stress—Text
Subwords—Number
Origin—Text
Feature 1 —Number (Submorphs)
Feature 2—Number
FRAMESENTENCE
SentID—Primary Key
Sentence—Text
Type—Number
Syllables—Number
SESSION
SessID—Primary Key
Speaker—Text
DateRecorded—Date/Time
Tape—Text
F0DATA
NDID—Key
Index—Number
Value—Currency
DURDATA
NDID—Key
Index—Number
Value—Currency
Abs—Currency
PHONDATA
NDID—Key
Phones—Text
Dur—Currency
Stress—Text
SylPos—Number
PhonPos—Number
Rate—Number
Parse—Text
RECORDING
ID
Our
A (y=A+Bx)
B(y=A+Bx)
Descript
GROUP
GroupID—Primary Key
Syllables —Number
Stress—Text
Featurel—Number
Feature2—Number
SentencePos—Text
<Future exp.>
TEMPLATEF0
GroupID—Key
Index—Number
Value—Number
TEMPLATEDUR
GroupID—Key
Index—Number
Value—Number
DISTRIBUTIONF0
GroupID—Key
Index—Number
Value—Number
DISTRIBUTIONDUR
GroupID—Key
Index—Number
Value—Number
GROUPMEMBERS
GroupID—Key
NDID—Key
DistanceF0—Currency
DistanceDur—Currency
PHONSTAT
Phones—Text
Mean—Curr.
SSD—Curr.
Min—Curr.
Max—Curr.
CoVar—Currency
N—Number
Class—Text

FIELD DESCRIPTIONS

| | |
|---|---|
| NORMDATA | |
| NDID | Primary Key |
| Target | Target word. Key to WORD table. |
| Sentence | Source frame-sentence. Key to FRAMESENTENCE table. |
| SentencePos | Sentence position. INITIAL, MEDIAL, FINAL. |
| Follow | Word that follows the target word. Key to WORD table or 0 if none. |
| Session | Which session the recording was part of. Key to SESSION table. |
| Recording | Identifier for recording in Unix directories (raw data). |
| Attributes | Miscellaneous info.<br>F = F0 data considered to be anomalous.<br>D = Duration data considered to be anomalous.<br>A = Alternative F0<br>B = Alternative duration |
| PHONDATA | |
| NDID | Key to NORMDATA |
| Phones | String of 1 or 2 phonemes |
| Dur | Total duration for Phones |
| Stress | Stress of syllable to which Phones belong |
| SylPos | Position of syllable containing Phones (counting from 0) |
| PhonPos | Position of Phones within syllable (counting from 0) |
| Rate | Speech rate measure of utterance |
| Parse | L = Phones made by left-parse<br>R = Phones made by right-parse |
| PHONSTAT | |
| Phones | String of 1 or 2 phonemes |
| Mean | Statistical mean of duration for Phones |
| SSD | Sample standard deviation |
| Min | Minimum value observed |
| Max | Maximum value observed |
| CoVar | Coefficient of Variation (SSD/Mean) |
| N | Number of samples for this Phones group |
| Class | Classification<br>A = All samples included |

From the foregoing it will be appreciated that the present invention provides an apparatus and method for generating synthesized speech, wherein the normally missing prosody information is supplied from templates based on data extracted from human speech. As we have demonstrated, this prosody information can be selected from a database of templates and applied to the phonemic information through a lookup procedure based on stress patterns associated with the text of input words.

The invention is applicable to a wide variety of different text-to-speech and speech synthesis applications, including large domain applications such as textbooks reading applications, and more limited domain applications, such as car navigation or phrase book translation applications. In the limited domain case, a small set of fixed-frame sentences may be designated in advance, and a target word in that sentence can be substituted for an arbitrary word (such as a proper name or street name). In this case, pitch and timing for the frame sentences can be measured and stored from real speech, thus insuring a very natural prosody for most of the sentence. The target word is then the only thing requiring pitch and timing control using the prosody templates of the invention.

While the invention has been described in its presently preferred embodiment, it will be understood that the invention is capable of modification or adaptation without departing from the spirit of the invention as set forth in the appended claims.

What is claimed is:

1. An apparatus for generating synthesized speech from a text of input words, comprising:

a word dictionary containing information about a plurality of stored words, wherein said information identifies a stress pattern associated with each of said stored words;

a text processor that generates phonemic representations of said input words using said word dictionary to identify the stress pattern of said input words;

a prosody module having a database of standarized templates containing prosody information accessed via a stress pattern and a number of syllables, wherein said prosody information is normalized and parameterized;

a sound generation module that denormalizes and converts said standardized templates for applying to said phonemic representation; and denormalizing said template via a sound generation module, said denormalizing shifts said template to a height that fits said frame sentence pitch contour.

2. A method for training a prosody template using human speech, comprising:

segmenting words of a sentence into phonemes associated with syllables of said words;

assigning stress levels to said syllables;

grouping said words according to said stress levels thereby forming stress pattern groups;

adjusting intonation data associated with each one of said stress pattern groups thereby providing normalized data;

adjusting a pitch shift of said normalized data thereby providing transformed data; and storing said transformed data in a prosody database as a template.

3. The method of claim 2 wherein said normalized data is based on resampling said intonation data for a plurality of intonation points.

4. The method of claim 2 wherein said pitch shift constant is accomplished for said sentence via transformation of said intonation points into a log domain.

5. The method of claim 2 wherein said prosody template is populated with averaged transformed data of said stress pattern group.

6. The method of claim 2 further comprises the step of:

forming an elevation point for said target word, said elevation point based on linear regression of said transformed data and a word end-boundary.

7. The method of claim 4 wherein said elevation point is adjusted as a common reference point.

8. The method of claim 7 producing a constant representing said denormalizing based on the regression-line coefficient of said frame sentence pitch contour.

9. The method of claim 7 further comprises the step of:

accessing a duration template operably permitting denormalization of said duration information thereby associating a time with each of said syllables.

10. The method of claim 8 further comprises the step of:

transforming log-domain values of said duration template into linear values.

11. The method of claim 9 further comprises the step of:

resampling each of said syllable segments of the template for a fixed duration such that the total duration of (each) corresponds to the denormalized time values, whereby the intonation contour is associated with a physical timeline.

12. The method of claim 10 further comprises the steps of:

storing duration information as ratios of phoneme values to globally determined duration values, said globally determined duration values are based on mean values across the entire training corpus;

per-syllable values based on a sum of the observed phoneme; and said prosody template populated with said per-syllable versus global ratios operable permitting computation of an actual duration of said each syllable.

* * * * *